(12) United States Patent
Zhang

(10) Patent No.: US 12,354,053 B2
(45) Date of Patent: Jul. 8, 2025

(54) METHOD AND SERVER FOR PROCESSING APPLIANCE DEMAND INFORMATION

(71) Applicant: Beijing Jingdong Zhenshi Information Technology Co., Ltd., Beijing (CN)

(72) Inventor: Rongrong Zhang, Beijing (CN)

(73) Assignee: Beijing Jingdong Zhenshi Information Technology Co., Ltd., Beijing (CN)

( * ) Notice: Subject to any disclaimer, the term of this patent is extended or adjusted under 35 U.S.C. 154(b) by 357 days.

(21) Appl. No.: 17/918,461

(22) PCT Filed: Mar. 30, 2021

(86) PCT No.: PCT/CN2021/083734
§ 371 (c)(1),
(2) Date: Oct. 12, 2022

(87) PCT Pub. No.: WO2021/208712
PCT Pub. Date: Oct. 21, 2021

(65) Prior Publication Data
US 2023/0142118 A1      May 11, 2023

(30) Foreign Application Priority Data
Apr. 13, 2020   (CN) .......................... 202010284953.0

(51) Int. Cl.
*G06Q 10/087*      (2023.01)
*G06Q 10/0834*     (2023.01)
(Continued)

(52) U.S. Cl.
CPC ..... *G06Q 10/08345* (2013.01); *G06Q 10/087* (2013.01); *G06K 7/10128* (2013.01)

(58) Field of Classification Search
CPC .......... G06Q 10/08345; G06Q 10/087; G06Q 10/06315; G06Q 10/08; G06Q 10/083;
(Continued)

(56) References Cited

U.S. PATENT DOCUMENTS 8,001,017 B1 *   8/2011   Franco ............... G06Q 30/0601
                                                            705/28
10,671,968 B2 *  6/2020   Chen .................... G06Q 10/083
(Continued)

FOREIGN PATENT DOCUMENTS

| CN | 104732368 A | 6/2015 |
| CN | 105701699 A | 6/2016 |

(Continued)

OTHER PUBLICATIONS

International Search Report and Written Opinion for International Application No. PCT/CN2021/083734, dated Jun. 18, 2021, 8 pages.

*Primary Examiner* — Garcia Ade
(74) *Attorney, Agent, or Firm* — Buchanan Ingersoll & Rooney PC

(57) ABSTRACT

Disclosed in embodiments of the present invention are a method and server for processing appliance demand information. One specific embodiment of the method comprises: obtaining appliance demand information, wherein the appliance demand information comprises the number of required appliances and an appliance delivery address; determining a matching appliance provider and a matching warehouse from a preset appliance information set according to the appliance delivery address in the obtained demand information; generating a demand order according to the obtained appliance demand information and the matching appliance provider; updating an available state of the appliance corresponding to the demand order in the appliance information set; and sending the demand order to a target electronic device corresponding to the matching warehouse.

20 Claims, 6 Drawing Sheets

(51) Int. Cl.
*G06K 7/10* (2006.01)
*G06Q 10/10* (2023.01)

(58) Field of Classification Search
CPC .......... G06Q 10/0835; G06Q 30/0635; G06K 7/10128; G06K 7/0008; G06K 7/10297
USPC .......................................................... 705/28
See application file for complete search history.

(56) References Cited

U.S. PATENT DOCUMENTS

| | | |
|---|---|---|
| 2002/0123917 A1 | 9/2002 | Wolfe |
| 2004/0054600 A1 | 3/2004 | Shike et al. |
| 2017/0124511 A1* | 5/2017 | Mueller ................ H04W 4/029 |
| 2019/0034866 A1* | 1/2019 | Li ........................ G06Q 10/087 |

FOREIGN PATENT DOCUMENTS

| | | |
|---|---|---|
| CN | 107527146 A | 12/2017 |
| CN | 109359759 A | 2/2019 |
| CN | 109934679 A | 6/2019 |
| CN | 110135785 A | 8/2019 |
| CN | 111429072 A | 7/2020 |
| JP | 2002352154 A | 12/2002 |
| JP | 2003123007 A | 4/2003 |
| JP | 4258066 B2 | 4/2009 |
| JP | 2013242765 A | 12/2013 |
| JP | 2017514219 A | 6/2017 |
| JP | 2018165216 A | 10/2018 |
| KR | 20100127504 A | 12/2010 |
| KR | 20170142567 A | 12/2017 |
| WO | 0108072 A1 | 2/2001 |

\* cited by examiner

METHOD AND SERVER FOR PROCESSING APPLIANCE DEMAND INFORMATION

CROSS-REFERENCE TO RELATED APPLICATIONS

This patent application is a U.S. National Stage of International Application No. PCT/CN2021/083734, filed on Mar. 30, 2021, which claims the priority of the Chinese patent application filed on Apr. 13, 2020 with the application number 202010284953.0 and the invention titled "Method and Apparatus for Processing Appliance Demand Information", the entirety of which is incorporated by reference into this application.

TECHNICAL FIELD

Embodiments of the present disclosure relate to the field of computer technology, and in particular, to a method and server for processing appliance demand information.

BACKGROUND

With the development of Internet technology, the informatization construction of warehousing and logistics also plays an increasingly important role.

In the prior art, in response to goods purchasing demands of users, various E-commerce service platforms often implement shipping and delivery of goods, etc. from designated warehouses.

SUMMARY

Embodiments of the present disclosure propose a method and server for processing appliance demand information.

In a first aspect, an embodiment of the present disclosure provides a method for processing appliance demand information, the method including: obtaining appliance demand information, where the appliance demand information includes a number of required appliances and an appliance delivery address; determining a matching appliance provider and a matching warehouse from a preset appliance information set according to the appliance delivery address in the obtained appliance demand information, where appliance information in the appliance information set includes a number of available appliances provided by the appliance provider in each warehouse and a delivery address range corresponding to each warehouse; generating a demand order according to the obtained appliance demand information and the matching appliance provider; updating an available state of an appliance corresponding to the demand order in the appliance information set; and sending the demand order to a target electronic device corresponding to the matching warehouse, so that the appliance corresponding to the demand order is sent to the appliance delivery address.

In some embodiments, the determining a matching appliance provider and a matching warehouse from a preset appliance information set according to the appliance delivery address in the obtained appliance demand information, comprises: selecting a warehouse whose delivery address range covers the appliance delivery address from the preset appliance information set as a quasi-matching warehouse; selecting appliances that are in the quasi-matching warehouse and meet the appliance demand information from the preset appliance information set as quasi-target appliances; selecting an appliance that matches the number of required appliances from the quasi-target appliances as a target appliance; and determining an appliance provider to which the target appliance belongs as the matching appliance provider, and determining a warehouse where the target appliance is located as the matching warehouse.

In some embodiments, the selecting an appliance that matches the number of required appliances from the quasi-target appliances as a target appliance, comprises: selecting an appliance that matches the number of required appliances and belongs to a same appliance provider with the required appliances from the quasi-target appliances as the target appliance.

In some embodiments, the selecting an appliance that matches the number of required appliances from the quasi-target appliances as a target appliance, comprises: obtaining an acquisition amount corresponding to the quasi-target appliances, wherein the acquisition amount comprises a unit price and a shipping cost; and selecting an appliance that matches the number of required appliances from the quasi-target appliances as the target appliance, so that a total amount corresponding to the target appliance is minimized.

In some embodiments, the selecting an appliance that matches the number of required appliances from the quasi-target appliances as the target appliance, comprises: selecting, in response to determining that the minimized total amount corresponding to the target appliance in a plurality of warehouses is consistent, a warehouse having a highest priority from the plurality of warehouses; and selecting the target appliance from the selected warehouse having the highest priority.

In some embodiments, the generating a demand order according to the obtained appliance demand information and the matching appliance provider, comprises: generating a to-be-confirmed order according to the obtained appliance demand information and the matching appliance provider, wherein the to-be-confirmed order comprises the acquisition amount; sending the to-be-confirmed order to a client corresponding to the appliance demand information; and generating the demand order, in response to receiving confirmation information corresponding to the to-be-confirmed order.

In some embodiments, the generating a demand order according to the obtained appliance demand information and the matching appliance provider, comprises: querying the appliance information set to perform inventory verification, according to the matching appliance provider and the matching warehouse; and generating the demand order, in response to determining that an inventory requirement is met.

In some embodiments, the method further comprises: obtaining reported state information of the appliance corresponding to the demand order, to update state information of the demand order.

In some embodiments, the state information of the appliance is obtained in at least one of following ways: passive RFID (Radio Frequency Identification), active RFID, or NFC (Near Field Communication).

In some embodiments, the obtaining reported state information of the appliance corresponding to the demand order, to update state information of the demand order, comprises: obtaining, in response to receiving the state information of the appliance sent by an active RFID reader, a location of the active RFID reader; and updating the state information of the demand order, according to a relationship between the location of the active RFID reader and the appliance delivery address in the demand order corresponding to the state information.

In some embodiments, the updating the state information of the demand order, according to a relationship between the location of the active RFID reader and the appliance delivery address in the demand order corresponding to the state information, comprises: updating state information of the demand order to information indicating that an appliance has been delivered to the delivery address, in response to determining that the location of the active RFID reader matches the appliance delivery address in the demand order corresponding to the state information.

In some embodiments, after the updating the state information of the demand order to information indicating that an appliance has been delivered to the delivery address, the method further comprises: sending the information indicating that the appliance has been delivered to the delivery address to the appliance provider corresponding to the appliance demand information, so as to wake up a prompt device installed on the appliance matching the appliance delivery address; sending the information indicating that the appliance has been delivered to the delivery address to the client corresponding to the appliance demand information; and updating, in response to receiving confirmation information corresponding to the information indicating that the appliance has been delivered to the delivery address sent by the client corresponding to the appliance demand information, the state information of the demand order to information indicating that the appliance has been signed for.

In some embodiments, the active RFID reader comprises a vehicle-mounted active RFID reader; and the updating the state information of the demand order, according to a relationship between the location of the active RFID reader and the appliance delivery address in the demand order corresponding to the state information, comprises: updating, in response to determining that the location of the active RFID reader is between the matching warehouse and the appliance delivery address in the demand order corresponding to the state information, the state information of the demand order to information indicating that the appliance is in transit.

In some embodiments, the method further comprises: obtaining periodically the state information of the appliance corresponding to the demand order, to generate an appliance state information set, wherein the state information comprises identifier information and geographic location information; generating a rental order based on time, in response to determining that the obtained state information matches delivery address corresponding to the demand order; sending the rental order to the client corresponding to the appliance demand information; and sending prompt information, in response to determining that the obtained state information is abnormal.

In a second aspect, an embodiment of the present disclosure provides an apparatus for processing appliance demand information, the apparatus including: an obtaining unit, configured to obtain appliance demand information, where the appliance demand information includes a number of required appliances and an appliance delivery address; a determining unit, configured to determine a matching appliance provider and a matching warehouse from a preset appliance information set according to the appliance delivery address in the obtained appliance demand information, where appliance information in the appliance information set includes a number of available appliances provided by the appliance provider in each warehouse and a delivery address range corresponding to each warehouse; a first generating unit, configured to generate a demand order according to the obtained appliance demand information and the matching appliance provider; and update an available state of an appliance corresponding to the demand order in the appliance information set; and a first sending unit, configured to send the demand order to a target electronic device corresponding to the matching warehouse, so that the appliance corresponding to the demand order is sent to the appliance delivery address.

In some embodiments, the determining unit includes: a first selection module, configured to select a warehouse whose delivery address range covers the appliance delivery address from the preset appliance information set as a quasi-matching warehouse; a second selection module, configured to select appliances that are in the quasi-matching warehouse and meet the appliance demand information from the preset appliance information set as quasi-target appliances; a third selection module, configured to select an appliance that matches the number of required appliances from the quasi-target appliances as a target appliance; and a determining module, configured to determine an appliance provider to which the target appliance belongs as the matching appliance provider, and determine a warehouse where the target appliance is located as the matching warehouse.

In some embodiments, the third selection module is further configured to: select an appliance that matches the number of required appliances and belongs to a same appliance provider with the required appliances from the quasi-target appliances as the target appliance.

In some embodiments, the third selection module includes: a first obtaining submodule, configured to obtain an acquisition amount corresponding to the quasi-target appliances, where the acquisition amount includes a unit price and a shipping cost; and a selection submodule, configured to select an appliance that matches the number of required appliances from the quasi-target appliances as the target appliance, so that a total amount corresponding to the target appliance is minimized.

In some embodiments, the selection submodule is further configured to: select, in response to determining that the minimized total amount corresponding to the target appliance in a plurality of warehouses is consistent, a warehouse having a highest priority from the plurality of warehouses; and select the target appliance from the selected warehouse having the highest priority.

In some embodiments, the first generating unit includes: a first generating module, configured to generate a to-be-confirmed order according to the obtained appliance demand information and the matching appliance provider, where the to-be-confirmed order includes the acquisition amount; a sending module, configured to send the to-be-confirmed order to a client corresponding to the appliance demand information; and a second generating module, configured to generate the demand order, in response to receiving confirmation information corresponding to the to-be-confirmed order.

In some embodiments, the first generating unit includes: a verification module, configured to query the appliance information set to perform inventory verification, according to the matching appliance provider and the matching warehouse; and a third generating module, configured to generate the demand order, in response to determining that an inventory requirement is met.

In some embodiments, the apparatus further includes: an update unit, configured to obtain reported state information of the appliance corresponding to the demand order, to update state information of the demand order.

In some embodiments, the state information of the appliance is obtained in at least one of following ways: passive RFID, active RFID, or NFC.

In some embodiments, the update unit is further configured to: obtain, in response to receiving the state information of the appliance sent by an active RFID reader, a location of the active RFID reader; and update the state information of the demand order, according to a relationship between the location of the active RFID reader and the appliance delivery address in the demand order corresponding to the state information.

In some embodiments, the update unit is further configured to: update the state information of the demand order to information indicating that an appliance has been delivered to the delivery address, in response to determining that the location of the active RFID reader matches the appliance delivery address in the demand order corresponding to the state information.

In some embodiments, the apparatus further includes: a wake-up unit, configured to send the information indicating that the appliance has been delivered to the delivery address to the appliance provider corresponding to the appliance demand information, so as to wake up a prompt device installed on the appliance matching the appliance delivery address; an information sending unit, configured to send the information indicating that the appliance has been delivered to the delivery address to the client corresponding to the appliance demand information; and a signing-for unit, configured to update, in response to receiving confirmation information corresponding to the information indicating that the appliance has been delivered to the delivery address sent by the client corresponding to the appliance demand information, the state information of the demand order to information indicating that the appliance has been signed for.

In some embodiments, the active RFID reader includes a vehicle-mounted active RFID reader; and the update unit is further configured to: update, in response to determining that the location of the active RFID reader is between the matching warehouse and the appliance delivery address in the demand order corresponding to the state information, the state information of the demand order to information indicating that the appliance is in transit.

In some embodiments, the apparatus further includes: a second generating unit, configured to obtain periodically the state information of the appliance corresponding to the demand order, to generate an appliance state information set, where the state information includes identifier information and geographic location information; a third generating unit, configured to generate a rental order based on time, in response to determining that the obtained state information matches delivery address corresponding to the demand order; a second sending unit, configured to send the rental order to the client corresponding to the appliance demand information; and a third sending unit, configured to send prompt information, in response to determining that the obtained state information is abnormal.

In a third aspect, an embodiment of the present disclosure provides a server, the server including: one or more processors; a storage apparatus, storing one or more programs thereon; and the one or more programs, when executed by the one or more processors, cause the one or more processors to implement the method as described in any one of the implementations of the first aspect.

In a fourth aspect, an embodiment of the present disclosure provides a computer readable medium, storing a computer program thereon, the program, when executed by a processor, implements the method as described in any one of the implementations of the first aspect.

BRIEF DESCRIPTION OF THE DRAWINGS

Other features, objectives and advantages of the present disclosure will become more apparent upon reading detailed description of non-limiting embodiments with reference to the following accompanying drawings.

DETAILED DESCRIPTION OF EMBODIMENTS

The present disclosure will be further described in detail below with reference to the accompanying drawings and embodiments. It may be understood that the specific embodiments described herein are only used to explain the related disclosure, but not to limit the disclosure. In addition, it should also be noted that, for ease of description, only parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
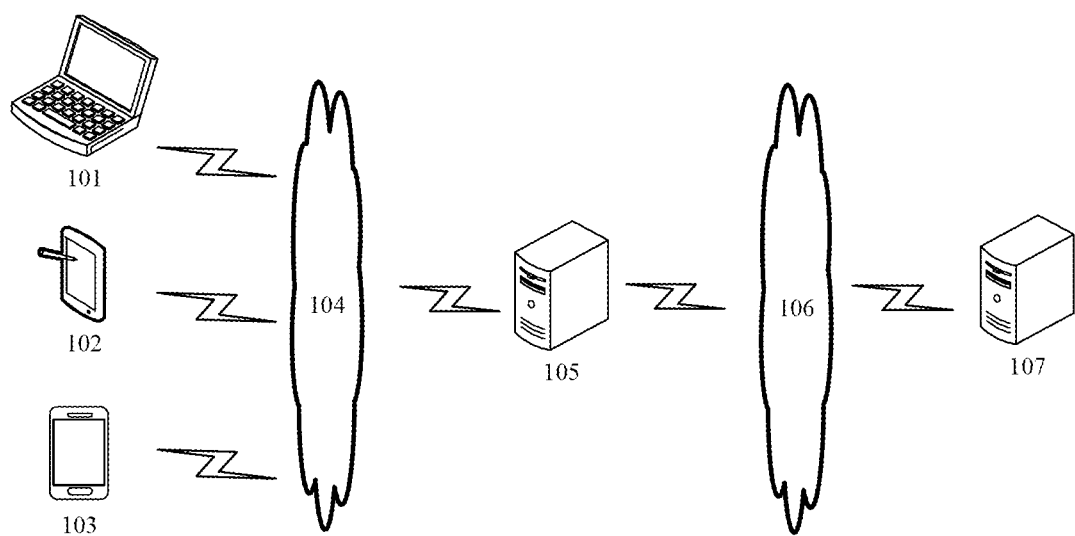
FIG. 1 is an exemplary system architecture diagram to which an embodiment of the present disclosure may be applied.

FIG. 1 shows an exemplary architecture 100 to which a method for processing appliance demand information or an apparatus for processing appliance demand information of the present disclosure may be applied.

As shown in FIG. 1, the system architecture 100 may include terminal devices 101, 102, 103, networks 104, 106 and servers 105, 107. The networks 104, 106 serve as mediums for providing a communication link between the terminal devices 101, 102, 103 and the server 105 and between the server 105 and the server 107. The networks 104, 106 may include various types of connections, such as wired or wireless communication links, or optical fiber cables.

The terminal devices 101, 102, and 103 interact with the server 105 via the network 104 to receive or send messages or the like. Various communication client applications may be installed on the terminal devices 101, 102 and 103, such as web browser applications, shopping applications, search applications, instant messaging tools, or email clients.

The terminal devices 101, 102, and 103 may be hardware or software. When the terminal devices 101, 102, and 103 are hardware, they may be various electronic devices having display screens and supporting human-computer interaction, including but not limited to smart phones, tablet computers, laptop computers, and desktop computers. When the terminal devices 101, 102, 103 are software, they may be installed in the electronic devices listed above. They may be implemented as a plurality of software or software modules (for example, software or software modules for providing distributed services), or as a single software or software module, which is not limited herein.

The server 105 may be a server that provides various services, such as a backend server that provides support for shopping applications on the terminal devices 101, 102, and 103. The backend server may analyze and process received appliance demand information, and perform corresponding processing according to the above request (for example, send a generated order to the backend server 107 of an appliance storage warehouse, so that a corresponding appliance may be shipped from the warehouse), and may also feed back a generated processing result (such as the order) to the terminal devices.

It should be noted that the server may be hardware or software. When the server is hardware, it may be implemented as a distributed server cluster composed of multiple servers, or may be implemented as a single server. When the server is software, it may be implemented as multiple software or software modules (for example, software or software modules for providing distributed services), or may be implemented as a single software or software module, which is not limited herein.

It should be noted that the method for processing appliance demand information provided by the embodiments of the present disclosure is generally performed by the server 105, and accordingly, the apparatus for processing appliance demand information is generally provided in the server 105.

It should be understood that the numbers of terminal devices, networks and servers in FIG. 1 are merely illustrative. There may be any number of terminal devices, networks and servers depending on the implementation needs.

Figure 2:
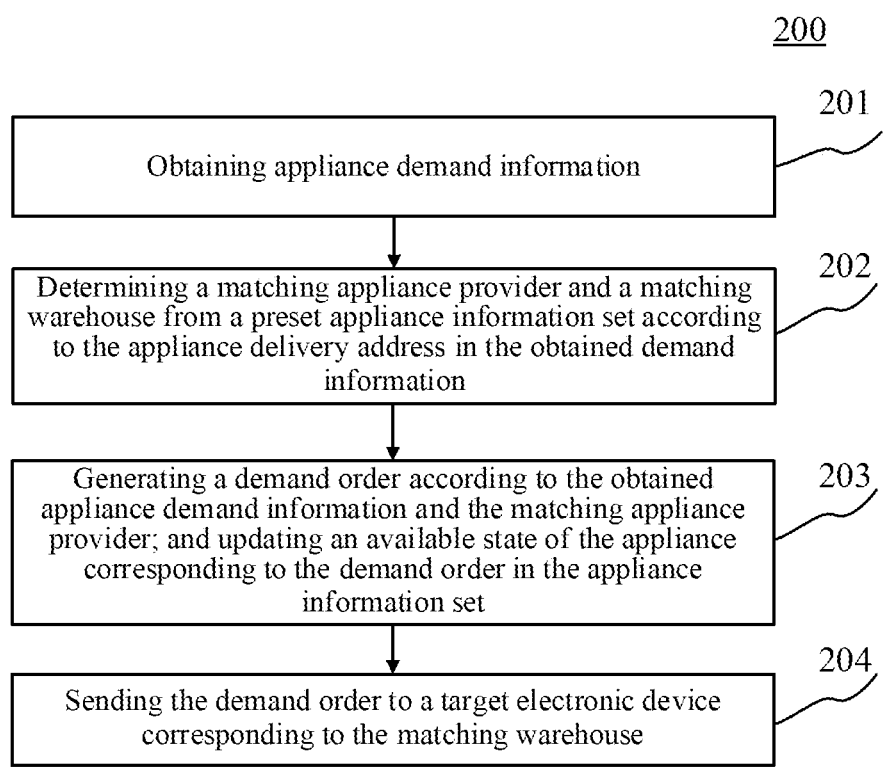
FIG. 2 is a flowchart of an embodiment of a method for processing appliance demand information according to the present disclosure.

With further reference to FIG. 2, illustrating a flow 200 of an embodiment of a method for processing appliance demand information according to the present disclosure. The method for processing appliance demand information includes the following steps:

Step 201, obtaining appliance demand information.

In the present embodiment, an executing body (the server 105 shown in FIG. 1) of the method for processing appliance demand information may obtain the appliance demand information through wired connection or wireless connection. The appliance demand information may include the number of required appliances and an appliance delivery address. The appliance demand information may include, but is not limited to, appliance purchase information and appliance rental information.

As an example, the executing body may obtain the appliance demand information pre-stored locally, and may also obtain the appliance demand information from an electronic device (e.g., a terminal device shown in FIG. 1) that is in communication connection with the executing body.

In some alternative implementations of the present embodiment, the above appliance demand information may also include at least one of the following: a model of the required appliance, or a delivery method. The delivery method may include store picking-up or delivering to the delivery address.

Based on the above alternative implementations, the number of required appliances included in the appliance demand information may include the number respectively corresponding to each model of appliance. So that the selection of appliances may be refined.

Step 202, determining a matching appliance provider and a matching warehouse from a preset appliance information set according to the appliance delivery address in the obtained application demand information.

In the present embodiment, according to the appliance delivery address in the demand information obtained in step 201, the executing body may determine the matching appliance provider and the matching warehouse from the preset appliance information set in various ways. Appliance information in the appliance information set includes the number of available appliances provided by the appliance provider in each warehouse and a delivery address range corresponding to each warehouse. Typically, there may be a many-to-many relationship between the warehouse and the appliance provider, that is, the appliance provider may place the appliances in warehouses at different locations, and the warehouse may also store appliances belonging to different appliance providers.

In the present embodiment, for example, the executing body may first determine from the preset appliance information set, a warehouse whose corresponding delivery address range covers the appliance delivery address. Then, the executing body may generate to-be-selected appliance information based on the number of available appliances provided by each appliance provider in the determined warehouse. Next, the executing body may send the generated to-be-selected appliance information to a client corresponding to the appliance demand information. In response to receiving the to-be-selected appliance information sent by the corresponding client, the executing body may determine the matching appliance provider and the matching warehouse based on the to-be-selected appliance information. Here, the to-be-selected appliance information may include information on an appliance provider to which the required appliance belongs and/or information on a warehouse where the required appliance is located.

In some alternative implementations of the present embodiment, based on the model of the required appliance included in the appliance demand information, the appliance information in the appliance information set may include the number of available appliances of each model provided by the appliance provider in each warehouse and the delivery address range corresponding to each warehouse.

In some alternative implementations of the present embodiment, the executing body may determine the matching appliance provider and the matching warehouse from the preset appliance information set according to the following steps:

The first step is to select a warehouse whose delivery address range covers the appliance delivery address from the preset appliance information set as a quasi-matching warehouse.

In these implementations, the executing body may, according to the appliance delivery address in the appliance demand information, select the warehouse whose delivery address range covers the appliance delivery address as the quasi-matching warehouse. Therefore, the executing body may select a plurality of quasi-matching warehouses.

The second step is to select appliances that are in the quasi-matching warehouse and meet the appliance demand information from the preset appliance information set as quasi-target appliances.

In these implementations, the executing body may select the appliances that are in the quasi-matching warehouse and meet the appliance demand information as the quasi-target appliances. As an example, the number of required appliances in the appliance demand information is 10, the executing body may use all available appliances in the quasi-matching warehouse as the quasi-target appliances. As yet another example, the required appliances in the appliance demand information are 10 medium-sized appliances and 20 small-sized appliances. Then, the executing body may use available medium-sized appliances and small-sized appliances in the quasi-matching warehouse as the quasi-target appliances.

The third step is to select an appliance that matches the number of required appliances from the quasi-target appliances as a target appliance.

In these implementations, the executing body may select, from the quasi-target appliances selected in the second step, the appliance that matches the number of required appliances as the target appliance in various ways. As an example, the executing body may select, from the quasi-target appliances, appliances located in the same warehouse that match the number of required appliances as the target appliances. Therefore, since the entire order is matched according to the same delivery warehouse, circulation of delivery orders may be reduced. From a user's point of view, there is no need to perform multiple receipt operations, thereby improving the user experience.

Alternatively, in response to a plurality of warehouses meeting the number of required appliances, the executing body may also select the target appliance according to a priority of each warehouse. The priority may be determined according to, for example, a distance from the appliance delivery address.

Alternatively, the executing body may also select an appliance that matches the number of required appliances and belongs to the same appliance provider from the quasi-target appliances as the target appliance. Therefore, since the entire order is matched according to the same appliance provider, a billing process may be simplified. From a user's point of view, there is no need to perform multiple payment operations, thereby improving the user experience.

Alternatively, the executing body may also first obtain an acquisition amount corresponding to the quasi-target appliances. The acquisition amount may include a unit price and a shipping cost. The unit price and the shipping cost may usually be determined by an appliance provider to which the quasi-target appliances belongs. Then, the executing body may select an appliance that matches the number of required appliances from the quasi-target appliances as the target appliance, so that a total amount corresponding to the target appliance is minimized. Therefore, the executing body may select a solution with the lowest total amount from the quasi-target appliances. Alternatively, in response to determining that the minimized total amount corresponding to the target appliance in a plurality of warehouses is the same, the executing body may select a warehouse having a highest priority from the plurality of warehouses. Then, the executing body may select the target appliance from the selected warehouse having the highest priority. As an example, if the total amount corresponding to the target appliance in warehouse A and warehouse B is the same and less than that of other warehouses that meet the demand, the executing body may select the target appliance from the warehouse having higher priority in warehouse A and warehouse B.

The fourth step is to determine an appliance provider to which the target appliance belongs as the matching appliance provider, and determine a warehouse where the target appliance is located as the matching warehouse.

Based on the above alternative implementations, the executing body may provide different solutions for the delivery of appliances according to different demands, so as to meet various personalized needs of users, such as cost of use, convenient delivery, or independent choice.

Step 203, generating a demand order according to the obtained appliance demand information and the matching appliance provider; and updating an available state of an appliance corresponding to the demand order in the appliance information set.

In the present embodiment, according to the appliance demand information obtained in step 201 and the matching appliance provider determined in step 202, the executing body may generate the demand order in various ways. The demand order may include the number of required appliances and the matching appliance provider. Alternatively, the demand order may also include, but is not limited to, at least one of the following: the appliance delivery address, a total amount of the order, the unit price of the appliance, the shipping cost, or information on the warehouse where the appliance is located.

In the present embodiment, after generating the demand order, the executing body may also update the available state of the appliance corresponding to the demand order in the appliance information set. As an example, the executing body may update the state of the appliance corresponding to the demand order in the appliance information set to unavailable.

In some alternative implementations of the present embodiment, the executing body may also generate the demand order according to the following steps:

The first step is to generate a to-be-confirmed order according to the obtained appliance demand information and the matching appliance provider.

In these implementations, the executing body may generate the to-be-confirmed order, according to the appliance demand information obtained in step 201 and the matching appliance provider determined in step 202. The to-be-confirmed order may include an acquisition amount corresponding to the required appliance. The acquisition amount may include the total amount. Alternatively, the acquisition amount may also include, but is not limited to, at least one of the following: the unit price corresponding to each required appliance, the shipping cost. The to-be-confirmed order may also include the appliance demand information and the matching appliance provider. Alternatively, the to-be-confirmed order may also include interfaces of payment institutions (such as online banking).

The second step is to send the to-be-confirmed order to a client corresponding to the appliance demand information.

The third step is to generate the demand order, in response to receiving confirmation information corresponding to the to-be-confirmed order.

In these implementations, in response to receiving the confirmation information corresponding to the to-be-confirmed order, the executing body may generate the demand order. The confirmation information may be used to indicate confirmation of content included in the to-be-confirmed order by a user using the client. The confirmation information usually further includes information indicating that a payment operation corresponding to the acquisition amount has been completed. As an example, the user using the client may click a "pay" button after checking the content included in the to-be-confirmed order. Then, the client may call the interface of a payment institution (such as online banking), and generate the confirmation information after the user completes the payment operation.

Based on the above alternative implementations, the demand order may be generated through the confirmation of the client, which reduces an error rate of orders, saves labor, logistics and other costs caused by order errors.

In some alternative implementations of the present embodiment, the executing body may also generate the demand order according to the following steps:

The first step is to query the appliance information set to perform inventory verification, according to the matching appliance provider and the matching warehouse.

In these implementations, according to the matching appliance provider and the matching warehouse determined in step 202, the executing body may verify whether the inventory meets the demand by querying the appliance information set.

The second step is to generate the demand order, in response to determining that an inventory requirement is met.

In these implementations, in response to determining that an inventory indicated by the appliance information in the appliance information set meets requirements of the appliance demand information, the executing body may generate the demand order.

Based on the above alternative implementations, it may reconfirm whether the inventory in this regard meets the requirements of the appliance demand information by performing inventory verification on the appliance information set, thereby avoiding inventory changes caused by a time difference between the update of the appliance information set and possible information collection errors, and reducing costs such as network data transmission and manpower caused by inability to ship due to insufficient inventory.

Step 204, sending the demand order to a target electronic device corresponding to the matching warehouse.

In the present embodiment, the executing body may send the demand order to the target electronic device corresponding to the matching warehouse, so that the appliance corresponding to the demand order is sent to the appliance delivery address. The target electronic device may include various devices corresponding to the matching warehouse. As an example, the target electronic device may be a backend server responsible for the management of appliances in the matching warehouse. As another example, the target electronic device may be a controller of a mechanical device that controls the transmission of appliances in the matching warehouse. As yet another example, the target electronic device may also be a terminal used by staff responsible for the transportation of appliances in the matching warehouse.

In some alternative implementations of the present embodiment, the executing body may also continue to obtain reported state information of the appliance corresponding to the demand order, to update state information of the demand order. For example, the state information of the appliance may include, but is not limited to, at least one of the following: information indicating a delivering state of the appliance, or information indicating that the appliance has been signed for. As an example, each of the appliance may be marked with an identifier. The identifier may include, for example, a scannable barcode, a two-dimensional code, or the like. The executing body may receive the identifier of the appliance uploaded from nodes over the network. The nodes may include a reading device corresponding to the identifier installed at a preset location, and may also include the client used by the user.

In these implementations, based on the obtained state information of the appliance, the executing body may update the state information of the demand order. The state information of the demand order may include, but is not limited to, at least one of the following: the order has been shipped, or the order has been signed for.

Alternatively, for multiple generated demand orders, the executing body may also process the demand orders in an order indicated by MQ (message Queue).

Alternatively, the state information of the appliance may be obtained in at least one of following ways: passive RFID, active RFID, or NFC. Thus, the identifier of the appliance may include a passive RFID tag, an active RFID tag and an NFC apparatus. As an example, a reader matching the active RFID may be installed at a preset location. When an appliance installed with the active RFID tag passes an effective coverage area of the reader, the reader may read the active RFID tag and send the collected information to the executing body through a specific gateway platform. Therefore, the executing body may obtain a location corresponding to the active RFID tag based on the location where the reader is installed, and thereby determine the state information of the appliance.

Based on the above alternative implementations, the reporting of the state information of the appliance may be achieved by installing a small and adaptable identifier on the appliance.

Alternatively, the executing body may also update the state information of the demand order through the following steps: first, obtaining, in response to receiving the state information of the appliance sent by an active RFID reader, a location of the active RFID reader, then, updating the state information of the demand order, according to a relationship between the location of the active RFID reader and the appliance delivery address in the demand order corresponding to the state information.

As an example, in response to determining that the location of the active RFID reader matches the appliance delivery address in the demand order corresponding to the state information, the executing body may update the state information of the demand order to information indicating that the appliance has been delivered to the delivery address.

Alternatively, the executing body may also continue to perform the following steps:

The first step is to send the information indicating that the appliance has been delivered to the delivery address to the appliance provider corresponding to the appliance demand information, so as to wake up a prompt device installed on the appliance matching the appliance delivery address.

In these implementations, the prompt device may include, for example, an electronic device such as a light-emitting diode or an LED, which is used to identify a specific appliance (such as a to-be-unloaded appliance) among many appliances. The appliance provider may directly send a control instruction to the prompt device installed on the corresponding appliance according to the demand order. Alternatively, the executing body may also obtain a communication identifier of the specific appliance from the appliance provider, and send the control instruction to the appliance, which is not limited herein.

The second step is to send the information indicating that the appliance has been delivered to the delivery address to the client corresponding to the appliance demand information.

The third step is to update, in response to receiving confirmation information corresponding to the information indicating that the appliance has been delivered to the delivery address sent by the client corresponding to the appliance demand information, the state information of the demand order to information indicating that the appliance has been signed for.

Based on the above alternative implementations, through the prompt device, unloading staff can easily identify a to-be-unloaded appliance on a transport vehicle, which improves the logistics efficiency. It also saves labor by automatically updating the state of the demand order.

As yet another example, the active RFID reader may include a vehicle-mounted active RFID reader. In response to determining that the location of the active RFID reader is between the matching warehouse and the appliance delivery address in the demand order corresponding to the state information, the state information of the demand order is updated to information indicating that the appliance is in transit. The location of the vehicle-mounted active RFID reader may be obtained, for example, by a GPS apparatus mounted on the same vehicle. Therefore, by reading the active RFID tag on the appliance using the pre-installed vehicle-mounted active RFID reader, a transportation state of each appliance may be unbound from the specific vehicle, so that each appliance may be located and tracked directly by reading an address of the tag reader.

Alternatively, the demand order may also include a rental order. The obtained state information of the appliance may further include information indicating that the appliance has been returned. In response to determining that the number of appliances returned matches the number of required appliances in the rental order, the executing body may update the state information of the demand order. The state information of the demand order may include that the order has ended. Alternatively, the executing body may also update the corresponding appliance information in the preset appliance information set based on the information indicating that the appliance has been returned.

Figure 3A:
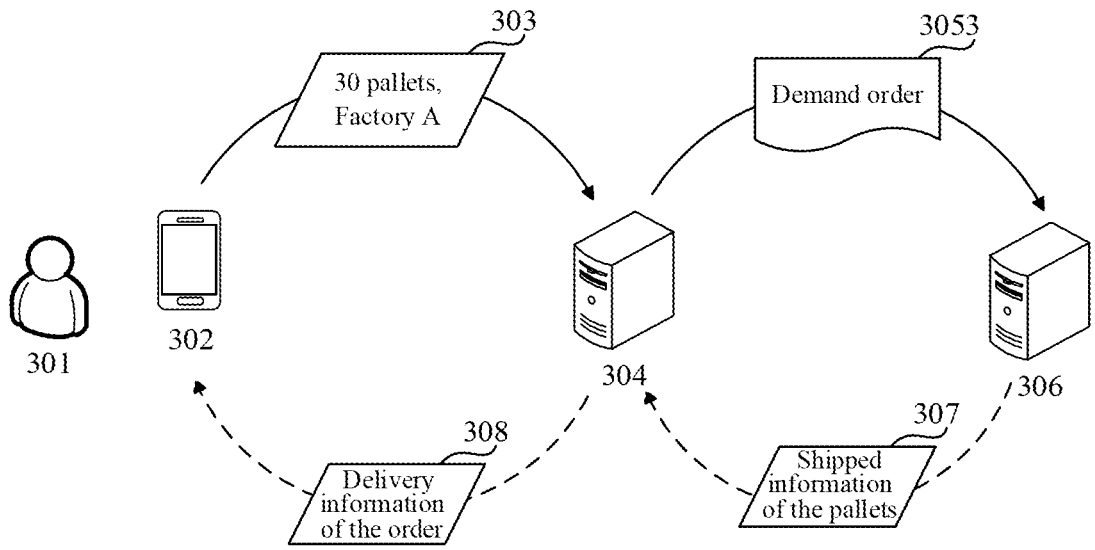
FIGS. 3a and 3b are schematic diagrams of an application scenario of the method for processing appliance demand information according to an embodiment of the present disclosure.
Figure 3B:
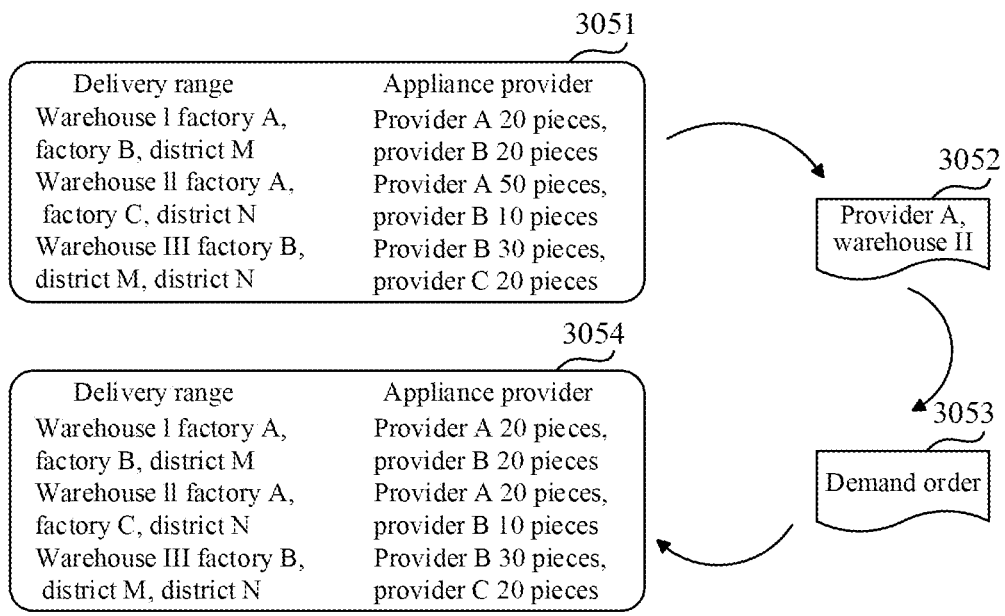

With further reference to FIG. 3a and FIG. 3b, FIGS. 3a and 3b are schematic diagrams of an application scenario of the method for processing appliance demand information according to an embodiment of the present disclosure. In the application scenario of FIG. 3a and FIG. 3b, a user 301 uses a terminal device 302 to send appliance demand information 303 including rental of 30 pallets and a delivery address is Factory A to a backend server 304. After obtaining the appliance demand information 303, according to the delivery address being Factory A, the backend server 304 determines a matching appliance provider and a matching warehouse as provider A and warehouse II respectively (as shown at 3052 in FIG. 3b) from a preset appliance information set 3051. Then, based on the appliance demand information 303 and the provider A, the backend server 304 generates a demand order 3053; and modifies the number of available appliances provided by the provider A in the warehouse II in the preset appliance information set to 20 (as shown at 3054 in FIG. 3b). Then, the backend server 304 may send the demand order 3053 to a server 306 that manages logistics of the warehouse II. Alternatively, in response to receiving information indicating that the pallets corresponding to the demand order have been shipped, the server 306 may send information 307 indicating that the pallets have been shipped to the backend server 304. Then, the backend server 304 may also send information 308 indicating delivery of the order to the terminal 302, so that the user 301 may learn the state of the order.

Currently, one of the existing technologies is usually to implement shipping and delivery of goods from a designated warehouse according to the delivery address. As a result, when the inventory is insufficient, it is often impossible to supply; and more manual participation is required when it involves cross-warehouse transfers. However, in the method provided by the above embodiments of the present disclosure, the matching appliance provider and the matching warehouse are automatically determined through the preset appliance information set, realizing flexible selection of shipment warehouses. Moreover, by updating the corresponding appliance state in the appliance information set in time after the demand order is generated, the warehousing situation can be accurately reflected, accurate data support is provided for automatic warehousing, and labor costs may be saved.

Figure 4:
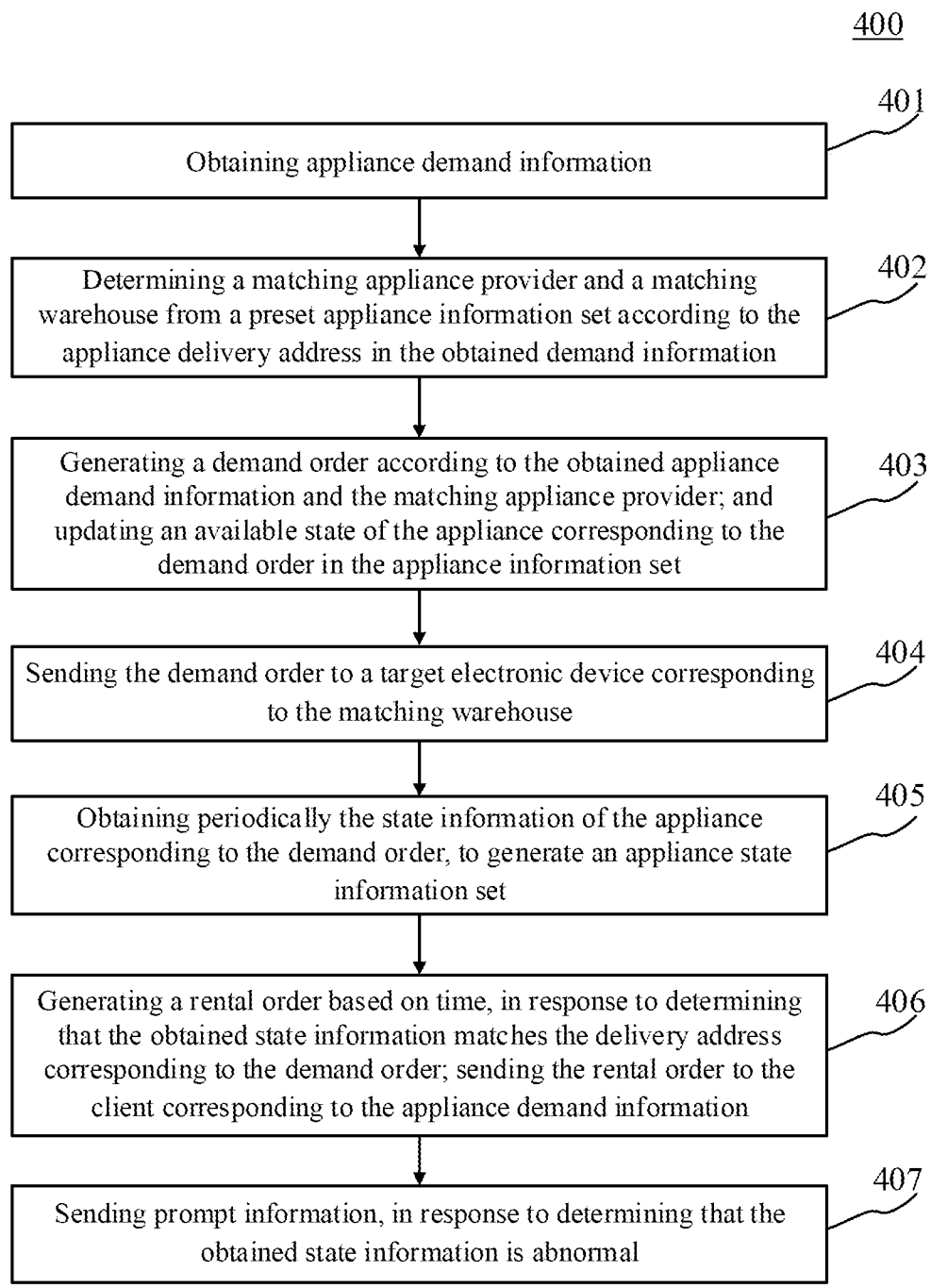
FIG. 4 is a flowchart of another embodiment of the method for processing appliance demand information according to the present disclosure.

With further reference to FIG. 4, illustrating a flow 400 of another embodiment of the method for processing appliance demand information. The flow 400 of the method for processing appliance demand information includes the following steps:

Step 401, obtaining appliance demand information.

Step 402, determining a matching appliance provider and a matching warehouse from a preset appliance information set according to the appliance delivery address in the obtained demand information.

Step 403, generating a demand order according to the obtained appliance demand information and the matching appliance provider; and updating an available state of the appliance corresponding to the demand order in the appliance information set.

Step 404, sending the demand order to a target electronic device corresponding to the matching warehouse.

It should be noted that the above steps 401, 402, 403 and 404 are respectively consistent with steps 201, 202, 203 and 204 in the foregoing embodiment and their alternative implementations. The above description for steps 201, 202, 203 and 204 and their alternative implementations are also applicable to steps 401, 402, 403 and 404, and detailed description thereof will be omitted.

Step 405, obtaining periodically the state information of the appliance corresponding to the demand order, to generate an appliance state information set.

In the present embodiment, an executing body (the server 105 shown in FIG. 1) of the method for processing appliance demand information may obtain the state information of the appliance in a way consistent with obtaining the state information of the appliance in the alternative implementations in the foregoing embodiment. The state information may include identifier information and geographic location information.

It should be noted that, typically, the above step 405 may be performed after the demand order is signed for. Therefore, by continuously collecting the state of each appliance after the order is signed for, a sufficient data basis may be provided for situations such as whether the appliance is lost, determining a distribution location of the appliance, analyzing circulation of each appliance, and analyzing an in and out state of appliances in each warehouse.

Step 406, generating a rental order based on time, in response to determining that the obtained state information matches the delivery address corresponding to the demand order; sending the rental order to the client corresponding to the appliance demand information.

In the present embodiment, in response to determining that the state information obtained in step 405 matches the delivery address corresponding to the demand order generated in step 403, the executing body may generate the rental order based on the time of use of the appliance. Then, the executing body may also send the generated rental order to the client corresponding to the appliance demand information. The rental order may include long-term rental bills (such as monthly bills) and short-term rental bills (such as hourly bills).

Step 407, sending prompt information, in response to determining that the obtained state information is abnormal.

In the present embodiment, in response to determining that the state information obtained in step 405 is abnormal, the executing body may send the prompt information. The abnormal state information may include, but is not limited to, at least one of the following: the location of the appliance exceeds a preset area, the state information of the appliance is not obtained after a preset duration, or the state information of the appliance indicating a malfunction.

As can be seen from FIG. 4, the flow 400 of the method for processing appliance demand information in the present embodiment embodies the step of obtaining the state information of the appliance corresponding to the demand order, and the step of performing a preset operation based on the obtained state information. Therefore, the solution described in the present embodiment may continuously obtain the location and usage of the appliance after the appliance is shipped, so as to provide a rich data basis for optimization of the entire signing-for, use, maintenance and appliance circulation solution after the appliance is shipped.

Figure 5:
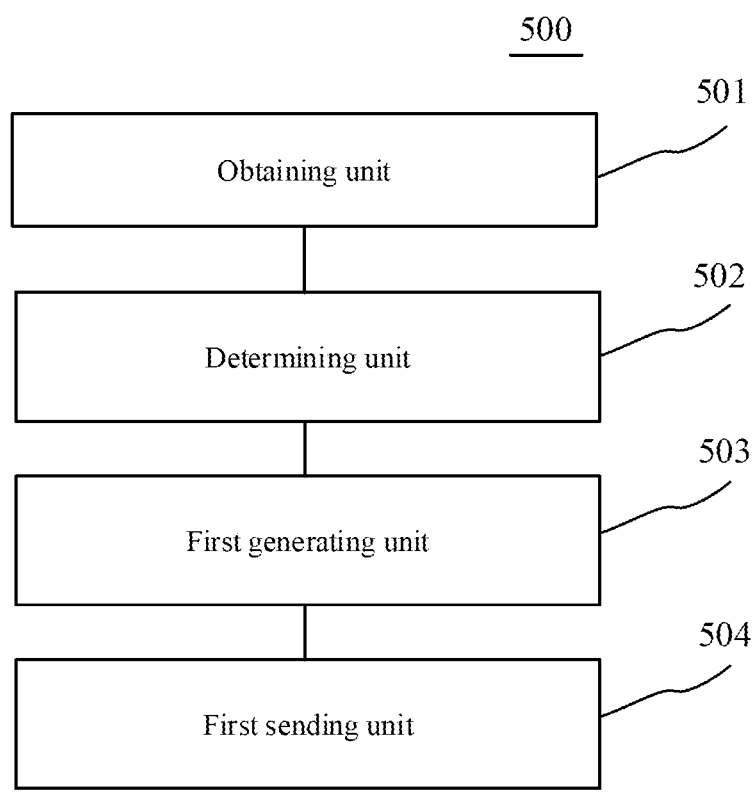
FIG. 5 is a schematic structural diagram of an embodiment of an apparatus for processing appliance demand information according to the present disclosure.

With further reference to FIG. 5, as an implementation of the method shown in the above figures, the present disclosure provides an embodiment of an apparatus for processing appliance demand information. The embodiment of the apparatus corresponds to the embodiment of the method shown in FIG. 2 or FIG. 4. Particularly, the apparatus may be applied in various electronic devices.

As shown in FIG. 5, an apparatus 500 for processing appliance demand information provided in the present embodiment includes: an obtaining unit 501, a determining unit 502, a first generating unit 503 and a first sending unit 504. The obtaining unit 501 is configured to obtain appliance demand information, where the appliance demand information includes the number of required appliances and an appliance delivery address. The determining unit 502 is configured to determine a matching appliance provider and a matching warehouse from a preset appliance information set according to the appliance delivery address in the obtained appliance demand information, where appliance information in the appliance information set includes the number of available appliances provided by the appliance provider in each warehouse and a delivery address range corresponding to each warehouse. The first generating unit 503 is configured to generate a demand order according to the obtained appliance demand information and the matching appliance provider; and update an available state of the appliance corresponding to the demand order in the appliance information set. The first sending unit 504 is configured to send the demand order to a target electronic device corresponding to the matching warehouse, so that the appliance corresponding to the demand order is sent to the appliance delivery address.

In the present embodiment, in the apparatus 500 for processing appliance demand information: for the specific processing and the technical effects of the obtaining unit 501, the determining unit 502, the first generating unit 503 and the first sending unit 504, reference may be made to the relevant descriptions of step 201, step 202, step 203 and step 204 in the corresponding embodiment of FIG. 2, respectively, and detailed description thereof will be omitted.

In some alternative implementations of the present embodiment, the determining unit 502 may include: a first selection module (not shown in the figure), a second selection module (not shown in the figure), a third selection module (not shown in the figure), and a determining module (not shown in the figure). The first selection module may be configured to select a warehouse whose delivery address range covers the appliance delivery address from the preset appliance information set as a quasi-matching warehouse. The second selection module may be configured to select appliances that are in the quasi-matching warehouse and meet the appliance demand information from the preset appliance information set as quasi-target appliances. The third selection module may be configured to select an appliance that matches the number of required appliances from the quasi-target appliances as a target appliance. The determining module may be configured to determine an appliance provider to which the target appliance belongs as the matching appliance provider, and determine a warehouse where the target appliance is located as the matching warehouse.

In some alternative implementations of the present embodiment, the third selection module may be further configured to: select an appliance that matches the number of required appliances and belongs to a same appliance provider with the required appliances from the quasi-target appliances as the target appliance.

In some alternative implementations of the present embodiment, the third selection module may include: a first obtaining submodule (not shown in the figure), and a selection submodule (not shown in the figure). The first obtaining submodule may be configured to obtain an acquisition amount corresponding to the quasi-target appliances, where the acquisition amount may include a unit price and a shipping cost. The selection submodule may be configured to select an appliance that matches the number of required appliances from the quasi-target appliances as the target appliance, so that a total amount corresponding to the target appliance is minimized.

In some alternative implementations of the present embodiment, the selection submodule may be further configured to: select, in response to determining that the minimized total amount corresponding to the target appliance in a plurality of warehouses is consistent, a warehouse having a highest priority from the plurality of warehouses; and select the target appliance from the selected warehouse having the highest priority.

In some alternative implementations of the present embodiment, the state information of the appliance may be obtained in at least one of following ways: passive RFID, active RFID, or NFC.

In some alternative implementations of the present embodiment, the update unit may be further configured to: obtain, in response to receiving the state information of the appliance sent by an active RFID reader, a location of the active RFID reader; and update the state information of the demand order, according to a relationship between the location of the active RFID reader and the appliance delivery address in the demand order corresponding to the state information.

In some alternative implementations of the present embodiment, the update unit may be further configured to: update the state information of the demand order to information indicating that an appliance has been delivered to the delivery address, in response to determining that the location of the active RFID reader matches the appliance delivery address in the demand order corresponding to the state information.

In some alternative implementations of the present embodiment, the apparatus may further include: a wake-up unit (not shown in the figure), configured to send the information indicating that the appliance has been delivered to the delivery address to the appliance provider corresponding to the appliance demand information, so as to wake up a prompt device installed on the appliance matching the appliance delivery address; an information sending unit (not shown in the figure), configured to send the information indicating that the appliance has been delivered to the delivery address to the client corresponding to the appliance demand information; and a signing-for unit (not shown in the figure), configured to update, in response to receiving confirmation information corresponding to the information indicating that the appliance has been delivered to the delivery address sent by the client corresponding to the appliance demand information, the state information of the demand order to information indicating that the appliance has been signed for.

In some alternative implementations of the present embodiment, the active RFID reader may include a vehicle-mounted active RFID reader; and the update unit may be further configured to: update, in response to determining that the location of the active RFID reader is between the matching warehouse and the appliance delivery address in the demand order corresponding to the state information, the state information of the demand order to information indicating that the appliance is in transit.

In some alternative implementations of the present embodiment, the first generating unit 503 may include: a first generating module (not shown in the figure), a sending module (not shown in the figure), and a second generating module (not shown in the figure). The first generating module may be configured to generate a to-be-confirmed order according to the obtained appliance demand information and the matching appliance provider. The to-be-confirmed order may include the acquisition amount. The sending module may be configured to send the to-be-confirmed order to a client corresponding to the appliance demand information. The second generating module may be configured to generate the demand order, in response to receiving confirmation information corresponding to the to-be-confirmed order.

In some alternative implementations of the present embodiment, the first generating unit 503 may include: a verification module (not shown in the figure), and a third generating module (not shown in the figure). The verification module may be configured to query the appliance information set to perform inventory verification, according to the matching appliance provider and the matching warehouse. The third generating module may be configured to generate the demand order, in response to determining that an inventory requirement is met.

In some alternative implementations of the present embodiment, the apparatus 500 for processing appliance demand information may further include: an update unit (not shown in the figure), a second generating unit (not shown in the figure), a third generating unit (not shown in the figure), a second sending unit (not shown in the figure), and a third sending unit (not shown in the figure). The update unit may be configured to obtain reported state information of the appliance corresponding to the demand order, to update state information of the demand order. The second generating unit may be configured to obtain periodically the state information of the appliance corresponding to the demand order, to generate an appliance state information set. The state information may include identifier information and geographic location information. The third generating unit may be configured to generate a rental order based on time, in response to determining that the obtained state information matches the delivery address corresponding to the demand order. The second sending unit may be configured to send the rental order to the client corresponding to the appliance demand information. The third sending unit may be configured to send prompt information, in response to determining that the obtained state information is abnormal.

In the apparatus provided by the above embodiment of the present disclosure, first the obtaining unit 501 obtains appliance demand information. The appliance demand information includes the number of required appliances and an appliance delivery address. Then, the determining unit 502 determines a matching appliance provider and a matching warehouse from a preset appliance information set according to the appliance delivery address in the obtained demand information. The appliance information in the appliance information set includes the number of available appliances provided by the appliance provider in each warehouse and a delivery address range corresponding to each warehouse. Next, the first generating unit 503 generates a demand order according to the obtained appliance demand information and the matching appliance provider; and updates an available state of the appliance corresponding to the demand order in the appliance information set. Finally, the first sending unit 504 sends the demand order to a target electronic device corresponding to the matching warehouse, so that the appliance corresponding to the demand order is sent to the appliance delivery address. Thus, flexible selection of shipment warehouses is achieved. Moreover, by updating the corresponding appliance state in the appliance information set in time after the demand order is generated, the warehousing situation can be accurately reflected, accurate data support is provided for automatic warehousing, and labor costs may be saved.

Figure 6:
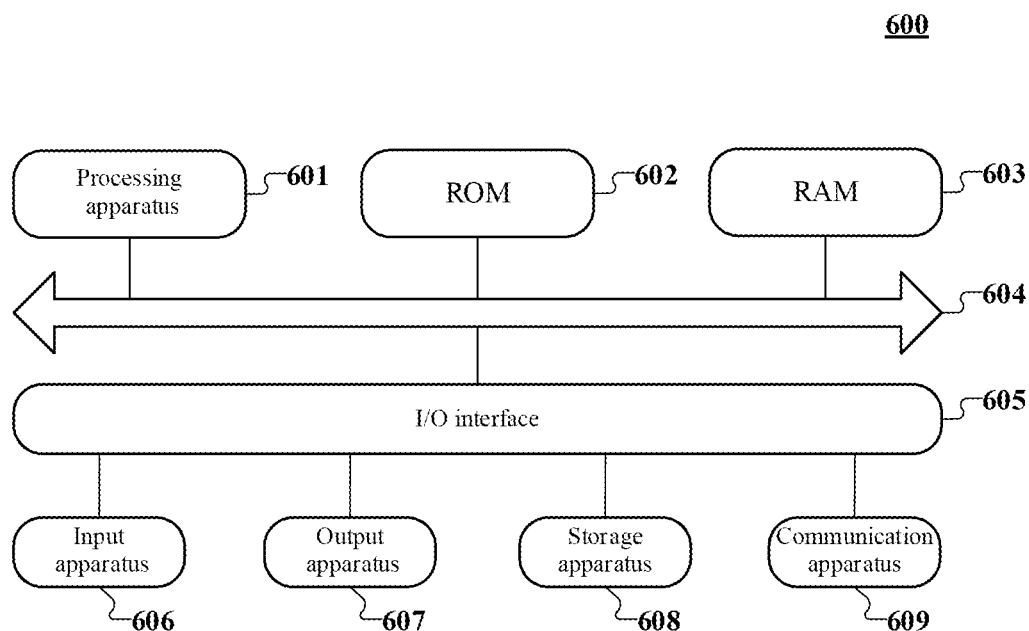
FIG. 6 is a schematic structural diagram of an electronic device suitable for implementing embodiments of the present disclosure.

Referring next to FIG. 6, FIG. 6 illustrates a schematic structural diagram of an electronic device (for example, the server shown in FIG. 1) 600 suitable for implementing embodiments of the present disclosure. Terminal devices in the embodiments of the present disclosure may include, but are not limited to, mobile terminals such as mobile phones, laptop computers, and stationary terminals such as digital TVs, desktop computers. The server shown in FIG. 6 is merely an example, and should not bring any limitations to the functions and usage scope of the embodiments of the present application.

As shown in FIG. 6, the electronic device 600 may include a processing apparatus (such as a central processing unit, a graphics processor) 601, which may execute various appropriate actions and processes in accordance with a program stored in a read-only memory (ROM) 602 or a program loaded into a random access memory (RAM) 603 from a storage apparatus 608. The RAM 603 also stores various programs and data required by operations of the electronic device 600. The processing apparatus 601, the ROM 602 and the RAM 603 are connected to each other through a bus 604. An input/output (I/O) interface 605 is also connected to the bus 604.

Typically, the following apparatuses may be connected to the I/O interface 605: an input apparatus 606 including a touch screen, a touch pad, a keyboard, a mouse, a camera, a microphone, an accelerometer, or a gyroscope; an output apparatus 607 including a liquid crystal display (LCD), a speaker, a vibrator; the storage apparatus 608 including a magnetic tape, or a hard disk; and a communication apparatus 609. The communication apparatus 609 may allow the electronic device 600 to perform wireless or wired communication with other devices to exchange data. Although FIG. 6 shows the electronic device 600 having various apparatuses, it should be understood that it is not required to implement or have all the illustrated apparatuses. It may alternatively be implemented or provided with more or fewer apparatuses. Each block shown in FIG. 6 may represent one apparatus, or may represent a plurality of apparatuses as needed.

In particular, according to embodiments of the present disclosure, the processes described above with reference to the flowcharts may be implemented in a computer software program. For example, an embodiment of the present disclosure includes a computer program product, which comprises a computer program that is tangibly embedded in a machine readable medium. The computer program includes program codes for performing the method as illustrated in the flowcharts. In such an embodiment, the computer program may be downloaded and installed from a network via the communication apparatus 609, or from the storage apparatus 608, or from the ROM 602. The computer program, when executed by the processing apparatus 601, implements the above mentioned functionalities as defined by the method of the embodiments of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatuses, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the embodiments of the present disclosure, the computer readable storage medium may be any physical medium containing or storing programs which can be used by a command execution system, apparatus or element or incorporated thereto. In the embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The computer readable signal medium may be any computer readable medium except for the computer readable storage medium. The computer readable signal medium is capable of transmitting, propagating or transferring programs for use by, or used in combination with, a command execution system, apparatus or element. The program codes contained on the computer readable medium may be transmitted with any suitable medium including but not limited to: wire, optical cable, RF (Radio Frequency), etc., or any suitable combination of the above.

The computer readable medium may be included in the server, or a stand-alone computer readable medium not assembled into the server. The computer readable medium carries one or more programs. The one or more programs, when executed by the server, cause the server to: obtain appliance demand information, where the appliance demand information includes the number of required appliances and an appliance delivery address; determine a matching appliance provider and a matching warehouse from a preset appliance information set according to the appliance delivery address in the obtained demand information, where appliance information in the appliance information set includes the number of available appliances provided by the appliance provider in each warehouse and a delivery address range corresponding to each warehouse; generate a demand order according to the obtained appliance demand information and the matching appliance provider; update an available state of the appliance corresponding to the demand order in the appliance information set; and send the demand order to a target electronic device corresponding to the matching warehouse, so that the appliance corresponding to the demand order is sent to the appliance delivery address.

A computer program code for performing operations in the embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, may be described as: a processor including an obtaining unit, a determining unit, a first generating unit and a first sending unit. Here, the names of these units do not in some cases constitute limitations to such units themselves. For example, the obtaining unit may also be described as "a unit configured to obtain appliance demand information, where the appliance demand information includes the number of required appliances and an appliance delivery address".

The above description only provides an explanation of the preferred embodiments of the embodiments of the present disclosure and the technical principles used. It should be appreciated by those skilled in the art that the inventive scope of the embodiments of the present disclosure is not limited to the technical solutions formed by the particular combinations of the above-described technical features. The inventive scope should also cover other technical solutions formed by any combinations of the above-described technical features or equivalent features thereof without departing from the concept of the embodiments of the present disclosure. Technical schemes formed by the above-described features being interchanged with, but not limited to, technical features with similar functions disclosed in the embodiments of the present disclosure are examples.

What is claimed is:

1. A method for processing appliance demand information, the method comprising:
   obtaining appliance demand information, wherein the appliance demand information comprises a number of required appliances and an appliance delivery address;
   determining a matching appliance provider and a matching warehouse from a preset appliance information set according to the appliance delivery address in the obtained appliance demand information, wherein appliance information in the appliance information set comprises a number of available appliances provided by the appliance provider in each warehouse and a delivery address range corresponding to each warehouse;
   generating a demand order according to the obtained appliance demand information and the matching appliance provider; and updating an available state of an appliance corresponding to the demand order in the appliance information set; and
   sending the demand order to a target electronic device corresponding to the matching warehouse, so that the appliance corresponding to the demand order is sent to the appliance delivery address,
   wherein the demand order comprises a rental order, and after the appliance corresponding to the demand order is shipped to the appliance delivery address, the method further comprises:
   periodically obtaining state information of the appliance corresponding to the demand order, wherein the state information comprises identifier information and geographic location information;
   in response to determining that the obtained state information is abnormal state information, sending prompt information, wherein the abnormal state information comprises: a location of the appliance exceeds a preset area, the state information is not obtained after a preset duration, or the state information of the appliance indicates a malfunction.

2. The method according to claim 1, wherein the determining a matching appliance provider and a matching warehouse from a preset appliance information set according to the appliance delivery address in the obtained appliance demand information, comprises:
   selecting a warehouse whose delivery address range covers the appliance delivery address from the preset appliance information set as a quasi-matching warehouse;
   selecting appliances that are in the quasi-matching warehouse and meet the appliance demand information from the preset appliance information set as quasi-target appliances;
   selecting an appliance that matches the number of required appliances from the quasi-target appliances as a target appliance; and
   determining an appliance provider to which the target appliance belongs as the matching appliance provider, and determining a warehouse where the target appliance is located as the matching warehouse.

3. The method according to claim 2, wherein the selecting an appliance that matches the number of required appliances from the quasi-target appliances as a target appliance, comprises:
   selecting an appliance that matches the number of required appliances and belongs to a same appliance provider with the required appliances from the quasi-target appliances as the target appliance.

4. The method according to claim 2, wherein the selecting an appliance that matches the number of required appliances from the quasi-target appliances as a target appliance, comprises:
   obtaining an acquisition amount corresponding to the quasi-target appliances, wherein the acquisition amount comprises a unit price and a shipping cost; and
   selecting an appliance that matches the number of required appliances from the quasi-target appliances as the target appliance, so that a total amount corresponding to the target appliance is minimized.

5. The method according to claim 4, wherein the selecting an appliance that matches the number of required appliances from the quasi-target appliances as the target appliance, comprises:
   selecting, in response to determining that the minimized total amount corresponding to the target appliance in a plurality of warehouses is consistent, a warehouse having a highest priority from the plurality of warehouses; and
   selecting the target appliance from the selected warehouse having the highest priority.

6. The method according to claim 1, wherein the generating a demand order according to the obtained appliance demand information and the matching appliance provider, comprises:
   generating a to-be-confirmed order according to the obtained appliance demand information and the matching appliance provider, wherein the to-be-confirmed order comprises the acquisition amount;
   sending the to-be-confirmed order to a client corresponding to the appliance demand information; and
   generating the demand order, in response to receiving confirmation information corresponding to the to-be-confirmed order.

7. The method according to claim 1, wherein the generating a demand order according to the obtained appliance demand information and the matching appliance provider, comprises:
   querying the appliance information set to perform inventory verification, according to the matching appliance provider and the matching warehouse; and
   generating the demand order, in response to determining that an inventory requirement is met.

8. The method according to claim 1, wherein the method further comprises:
   obtaining reported state information of the appliance corresponding to the demand order, to update state information of the demand order.

9. The method according to claim 8, wherein the state information of the appliance is obtained in at least one of following ways: passive RFID, active RFID, or NFC.

10. The method according to claim 9, wherein the obtaining reported state information of the appliance corresponding to the demand order, to update state information of the demand order, comprises:

obtaining, in response to receiving the state information of the appliance sent by an active RFID reader, a location of the active RFID reader; and updating the state information of the demand order, according to a relationship between the location of the active RFID reader and the appliance delivery address in the demand order corresponding to the state information.

11. The method according to claim 10, wherein the updating the state information of the demand order, according to a relationship between the location of the active RFID reader and the appliance delivery address in the demand order corresponding to the state information, comprises:

updating state information of the demand order to information indicating that an appliance has been delivered to the delivery address, in response to determining that the location of the active RFID reader matches the appliance delivery address in the demand order corresponding to the state information.

12. The method according to claim 11, wherein, after the updating the state information of the demand order to information indicating that an appliance has been delivered to the delivery address, the method further comprises:

sending the information indicating that the appliance has been delivered to the delivery address to the appliance provider corresponding to the appliance demand information, so as to wake up a prompt device installed on the appliance matching the appliance delivery address;

sending the information indicating that the appliance has been delivered to the delivery address to the client corresponding to the appliance demand information; and updating, in response to receiving confirmation information corresponding to the information indicating that the appliance has been delivered to the delivery address sent by the client corresponding to the appliance demand information, the state information of the demand order to information indicating that the appliance has been signed for.

13. The method according to claim 10, wherein the active RFID reader comprises a vehicle-mounted active RFID reader; and the updating the state information of the demand order, according to a relationship between the location of the active RFID reader and the appliance delivery address in the demand order corresponding to the state information, comprises:

updating, in response to determining that the location of the active RFID reader is between the matching warehouse and the appliance delivery address in the demand order corresponding to the state information, the state information of the demand order to information indicating that the appliance is in transit.

14. The method according to claim 1, wherein the method further comprises:

installing a light-emitting diode on the appliance corresponding to the demand order; and waking up the light-emitting diode so that the appliance corresponding to the demand order is identified in appliances, in response to determining that the appliance corresponding to the demand order has been delivered to the appliance delivery address.

15. A server, comprising:
one or more processors;
a storage apparatus, storing one or more programs thereon; and
the one or more programs, when executed by the one or more processors, cause the one or more processors to perform operations for processing appliance demand information, the operations comprising:
obtaining appliance demand information, wherein the appliance demand information comprises a number of required appliances and an appliance delivery address;
determining a matching appliance provider and a matching warehouse from a preset appliance information set according to the appliance delivery address in the obtained appliance demand information, wherein appliance information in the appliance information set comprises a number of available appliances provided by the appliance provider in each warehouse and a delivery address range corresponding to each warehouse;
generating a demand order according to the obtained appliance demand information and the matching appliance provider; and updating an available state of an appliance corresponding to the demand order in the appliance information set; and
sending the demand order to a target electronic device corresponding to the matching warehouse, so that the appliance corresponding to the demand order is sent to the appliance delivery address,
wherein the demand order comprises a rental order, and after the appliance corresponding to the demand order is shipped to the appliance delivery address, the operations further comprise:
periodically obtaining state information of the appliance corresponding to the demand order, wherein the state information comprises identifier information and geographic location information:
in response to determining that the obtained state information is abnormal state information, sending prompt information, wherein the abnormal state information comprises: a location of the appliance exceeds a preset area, the state information is not obtained after a preset duration, or the state information of the appliance indicates a malfunction.

16. A non-transitory computer readable medium, storing a computer program thereon, wherein, the program, when executed by a processor, performs operations for processing appliance demand information, the operations comprising:
obtaining appliance demand information, wherein the appliance demand information comprises a number of required appliances and an appliance delivery address;
determining a matching appliance provider and a matching warehouse from a preset appliance information set according to the appliance delivery address in the obtained appliance demand information, wherein appliance information in the appliance information set comprises a number of available appliances provided by the appliance provider in each warehouse and a delivery address range corresponding to each warehouse;
generating a demand order according to the obtained appliance demand information and the matching appliance provider; and updating an available state of an appliance corresponding to the demand order in the appliance information set; and
sending the demand order to a target electronic device corresponding to the matching warehouse, so that the appliance corresponding to the demand order is sent to the appliance delivery address, wherein the demand order comprises a rental order, and after the appliance corresponding to the demand order is shipped to the appliance delivery address, the operations further comprise:

periodically obtaining state information of the appliance corresponding to the demand order, wherein the state information comprises identifier information and geographic location information:

in response to determining that the obtained state information is abnormal state information, sending prompt information, wherein the abnormal state information comprises: a location of the appliance exceeds a preset area, the state information is not obtained after a preset duration, or the state information of the appliance indicates a malfunction.

17. The server according to claim 15, wherein the determining a matching appliance provider and a matching warehouse from a preset appliance information set according to the appliance delivery address in the obtained appliance demand information, comprises:

selecting a warehouse whose delivery address range covers the appliance delivery address from the preset appliance information set as a quasi-matching warehouse;

selecting appliances that are in the quasi-matching warehouse and meet the appliance demand information from the preset appliance information set as quasi-target appliances;

selecting an appliance that matches the number of required appliances from the quasi-target appliances as a target appliance; and determining an appliance provider to which the target appliance belongs as the matching appliance provider, and determining a warehouse where the target appliance is located as the matching warehouse.

18. The server according to claim 17, wherein the selecting an appliance that matches the number of required appliances from the quasi-target appliances as a target appliance, comprises:

selecting an appliance that matches the number of required appliances and belongs to a same appliance provider with the required appliances from the quasi-target appliances as the target appliance.

19. The server according to claim 17, wherein the selecting an appliance that matches the number of required appliances from the quasi-target appliances as a target appliance, comprises:

obtaining an acquisition amount corresponding to the quasi-target appliances, wherein the acquisition amount comprises a unit price and a shipping cost; and selecting an appliance that matches the number of required appliances from the quasi-target appliances as the target appliance, so that a total amount corresponding to the target appliance is minimized.

20. The server according to claim 19, wherein the selecting an appliance that matches the number of required appliances from the quasi-target appliances as the target appliance, comprises:

selecting, in response to determining that the minimized total amount corresponding to the target appliance in a plurality of warehouses is consistent, a warehouse having a highest priority from the plurality of warehouses; and selecting the target appliance from the selected warehouse having the highest priority.

* * * * *